Dec. 21, 1943.   W. V. THELANDER   2,337,135
CLUTCH PLATE
Original Filed Nov. 25, 1940    2 Sheets-Sheet 1
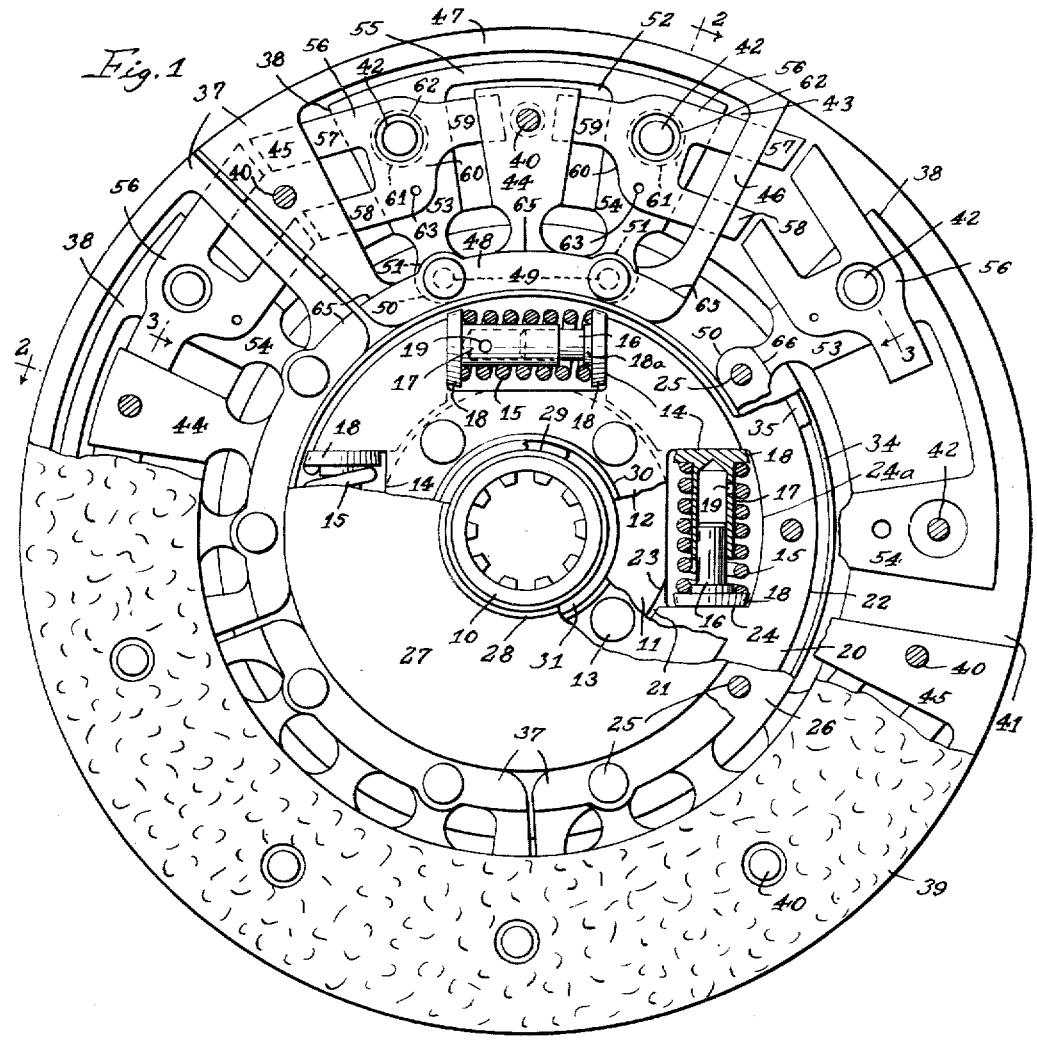
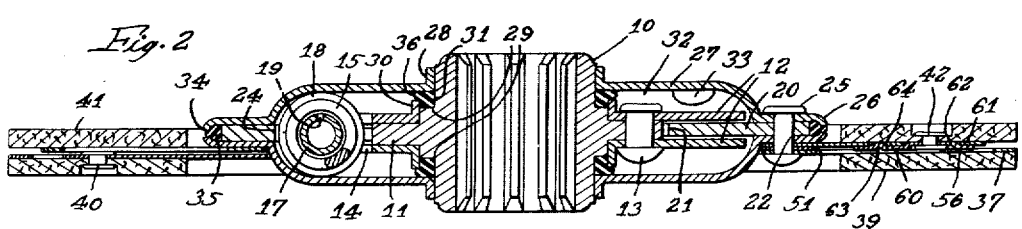
Inventor:
W. Vincent Thelander
By
McCanna, Wintercorn & Morsbach
Attys.

Dec. 21, 1943.  W. V. THELANDER  2,337,135
CLUTCH PLATE
Original Filed Nov. 25, 1940  2 Sheets-Sheet 2
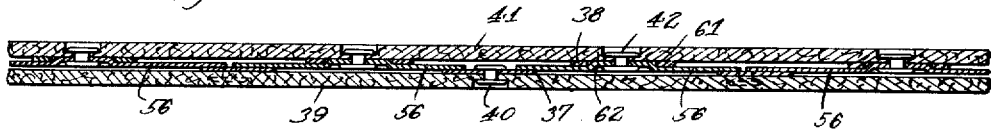
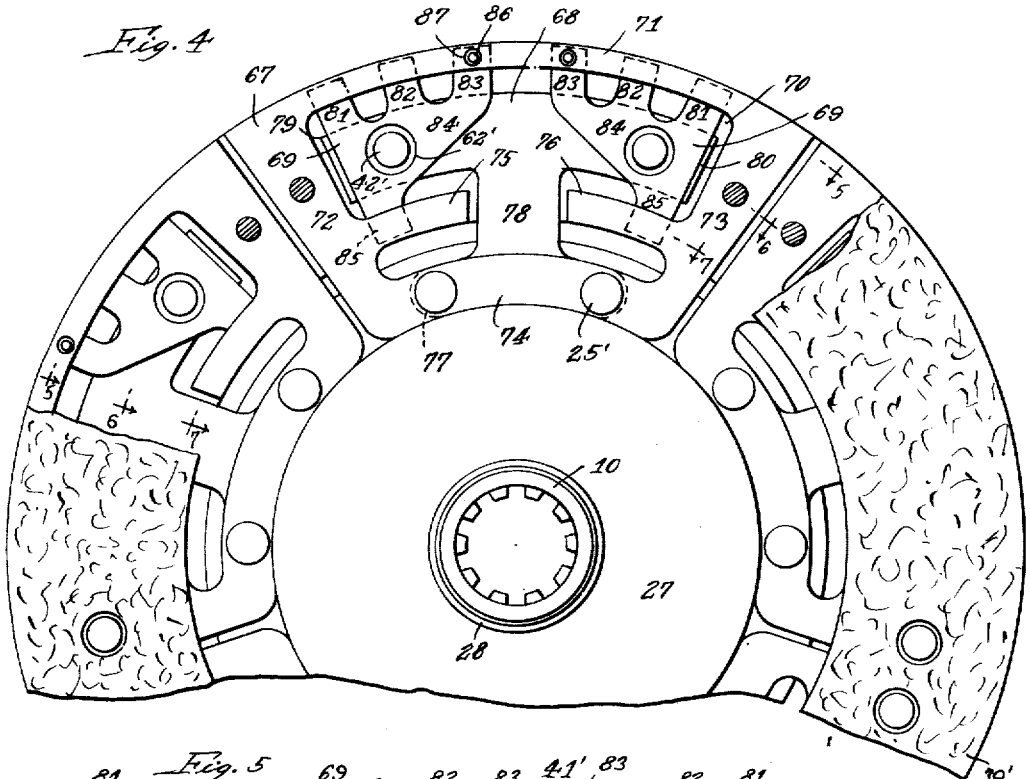
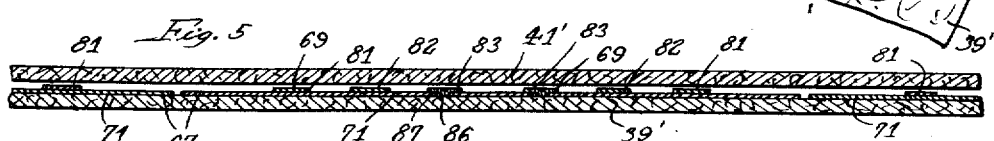
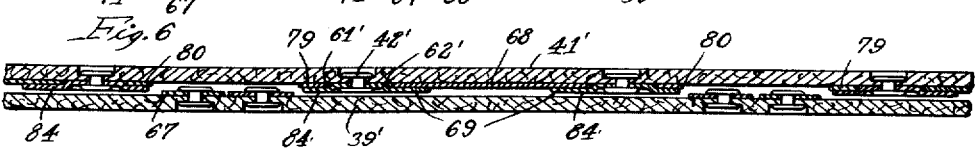
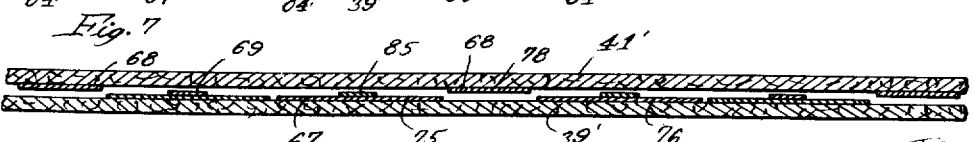
Inventor:
By W. Vincent Thelander
McCanna, Wintercorn & Morsbach
Attys.

Patented Dec. 21, 1943

2,337,135

UNITED STATES PATENT OFFICE 2,337,135

CLUTCH PLATE

W. Vincent Thelander, Auburn, Ind.

Original application November 25, 1940, Serial No. 366,960. Divided and this application June 28, 1941, Serial No. 400,310

24 Claims. (Cl. 192—107)

This invention relates to clutches generally and is more particularly concerned with improvements in automotive type friction clutches, this application being a division of my copending application, Serial No. 366,960, filed November 25, 1940, now Patent No. 2,316,820, issued April 20, 1943.

One of the principal objects of my invention consists in the provision of a clutch plate of sectional construction utilizing a number of small sheet metal stampings to build up the outer annular portion on which the annular facings are mounted, it being possible to produce these stampings with much less waste than is involved in the stamping of large disks, and it being also possible to produce these stampings from salvaged scrap material, so that the present structure is made available at a much lower cost than would otherwise be possible.

An important object of the invention consists in the provision of a clutch plate embodying an improved "mush" construction between the friction facings, a salient feature of which lies in the provision of flat leaf-springs which can be produced to the desired uniformity at much lower cost than specially shaped leaf-springs, and the use of which as compared with the conventional struck-out ears commonly provided as integral portions of clutch plates means an appreciable saving in cost by reason of the fact that it makes possible the use of ordinary sheet metal stampings for the plate proper instead of spring steel. With the present construction there is no difficulty in obtaining clutch plates in quantity production of uniform thickness in the facing portion and with the facings in substantial parallelism throughout the circumference, whereas with the other earlier constructions mentioned, such uniformity in thickness and parallelism of facing was not obtained, and as a result such plates when installed would not give as good performance nor would they last as long as could otherwise be expected.

The invention is illustrated in the accompanying drawings, in which—

Fig. 1 is a rear view of a clutch plate made in accordance with my invention showing approximately half of the hub housing plate broken away so as to better illustrate the hub construction and also showing approximately half of the friction facing removed to better illustrate the rest of the plate construction;

Fig. 2 is a section taken on the broken line 2—2 of Fig. 1;

Fig. 3 is a sectional detail on the arcuate line 3—3 of Fig. 1;

Fig. 4 is a view similar to Fig. 1 showing another clutch plate of the same construction so far as the hub portion is concerned but of different construction in the outer portion, approximately half of the friction facing being broken away to better illustrate that portion, and Figs. 5, 6, and 7 are sectional details on the correspondingly numbered arcuate lines of Fig. 4.

Similar reference numerals are applied to corresponding parts throughout the views.

Referring first to Figs. 1 and 2, the clutch plate shown comprises relative rotatable inner and outer portions, the inner portion being formed by a center hub 10 splined for driving connection with the driving shaft of an automotive transmission and provided with an annular flange 11 onto opposite sides of which two circular sheet metal plates 12 are riveted, as indicated at 13. These plates have a plurality of equally circumferentially spaced openings 14 provided therein, four in the present instance, one for each of a plurality of spring cushioning means 15, the openings in the two plates being in register with one another. Assembled in each opening 14 with the spring 15, in accordance with the disclosure in the parent application, is a piston 16 and cylinder 17 extending into the spring from opposite ends and provided with enlarged circular head ends 18 larger in diameter than the spring so as to space the ends of the spring from adjacent portions of the plate and avoid wear on the end coils. Each piston 16 has an annular shoulder 18a thereon at its outer end next to the head 18 of approximately the same outside diameter as the cylinder 17 so that both ends of the spring 15 are centered alike with relation to the heads 18. As more fully described in the parent application, the cylinder 17 has a bleeder hole 19 provided in the wall thereof for intake and exhaust of the heavy oil or grease with which the space around the hub 10 is filled. A ring 20, the inner and outer peripheries 21 and 22 of which are in concentric relation with the periphery 23 of the flange 11, has notches 24 cut therein in register wth the openings 14 and is disposed between the plates 12, as clearly appears in Fig. 2, for engagement of the ends of notched portions 24 with the spring cushioning means, the drive being taken at one end of the notched portions 24 and by the respectively opposite ends of the openings 14 in a manner well understood in this art. The radially outer side 24a of each of the notches 24 in the ring 20 are struck on arcs concentric with the inner and outer peripheries 21 and 22, as clearly appears in Fig. 1, and the head ends 18 of the pistons 16 and cylinders 17 are tapered, as indicated, to conform to these arcs 24a. The ring 20 is riveted at circumferentially spaced points, as indicated at 25, between the peripheral flanges 26 of two sheet metal housing plates 27. The latter have central circular openings defined by circular flanges 28 which have close fitting bearing engagement on the opposite ends of the hub 10 in spaced relation to the annular shoulders 29. The circular plates 12 fastened on the opposite sides of the flange 11 have circular central openings defined by outwardly bent flanges 30 fitting over the peripheries of the shoulders 29 and projecting from these shoulders toward the plates 27 to retain compressible resilient gaskets 31 which serve to seal the annular oil or grease chamber 32 in the hub housing against leakage of the heavy lubricating oil or grease with which the chamber 32 is filled, as indicated at 33 in Fig. 2. The flanges 26 project radially beyond outer periphery 22 of the ring 20 and have inwardly bent peripheral edge portions 34 between which another gasket 35 of compressible resilient material is retained in compressed condition to seal the outer periphery of the chamber 32 against leakage of the oil or grease 33. These gaskets 31 and 35 are preferably of an oil resistant rubber, such a neoprene. The gaskets 31 are compressed axially in the riveting of the housing plates 27, as indicated by the bulge 36, and in the slight rotary movement of the housing plates with respect to the hub this relative movement is easily accommodated by torsional distortion within the gaskets 31 themselves, so that there will be no likelihood of having to replace these gaskets due to wear. In passing, attention is called to the fact that the clutch disk proper, formed by the two sets of sheet metal stampings 37 and 38 are riveted with the housing plates 27 to the ring 20 by the rivets 25. The stampings 37 carry the annular facing ring 39 on rivets 40, and the stampings 38 carry the companion facing ring 41 on rivets 42.

In operation, when relative movement takes place between the inner and outer portions of the clutch plate, the springs 15 are compressed to cushion the drive. At the same time, the heavy oil or grease 33 with which the cylinders 17 are filled is discharged to some extent through the bleeder holes 19 so that these pumping devices add materially to the cushioning effect, accordingly relieving the springs 15 of some of the load. The heavy oil or grease 33 is indicated only to the extent shown in Fig. 2, to avoid confusion. The recoil action of the springs 15 is also checked by the pistons and cylinders 16—17 because their return to normal extended relationship is retarded as a result of the restriction of the bleeder holes 19 through which the heavy oil or grease 33 must flow. In that way, the secondary vibrations are absorbed and a smooth drive is obtained.

The sheet metal stampings 37 and 38 are of the segmental form clearly illustrated in Fig. 1, five of each of these stampings being used to complete the outer portion of the plate on which the facings 39 and 41 are carried, although, of course, it is obvious that the number of sections employed may be reduced or increased. Each stamping 37 has a generally U-shaped opening 43 punched therein defining a middle radial finger 44 and opposed radial fingers 45 and 46 interconnected by an arcuate outer peripheral web 47. The finger 44 extends outwardly from an inner arcuate peripheral web 48 interconnecting the inner ends of the fingers 45 and 46 and there are two circumferentially spaced holes 49 in the web 48 registering with similar holes in the inner arcuate peripheral web portion 50 of the companion stamping 38 through which openings the rivets 25 extend to fasten the stampings to the ring 20 along with the housing plates 27, washers 51 being preferably interposed between the stampings 37 and 38, one at each rivet, so as to space the stampings 37 and 38 for a purpose which will soon appear. Each stamping 38 has an opening 52 punched therein at the middle thereof whereby to define two radial fingers 53 and 54 interconnected at their inner ends by the aforesaid arcuate web 50 and interconnected at their outer ends by another arcuate web 55. Each pair of stampings 37 and 38 when placed in assembled relationship has the middle finger 44 of the stamping 37 disposed radially in the middle of the opening 52 in the stamping 38, and the two fingers 53 and 54 of the stamping 38 are disposed radially in the middle of the opposite end portions of the U-shaped opening 43, while the web 55 of the stamping 38 is disposed radially between the outer end of the finger 44 and the web 47 of the stamping 37. Now, bearing in mind the fact that the washers 51, which, by the way, are all of the same thickness, serve to space the stampings 37 and 38 in parallel planes, it will be clear that there is room between the stampings for flat leaf-springs 56 of approximately the same thickness as the washers 51, or less, so long as the leaf-springs are disposed, as shown in Figs. 1 and 2, in a parallel intermediate plane. Each of the leaf-springs 56 is generally h-shaped so as to provide two substantially parallel fingers 57 and 58 on one side and a single finger 59 on the other side of the transverse intermediate attaching portion 60. The springs 56 are mounted on the fingers 53 and 54 of the stampings 38 by means of their attaching portions 60 and are disposed in reversed relation to one another in overlapping relation to the middle finger 44 of the stamping 37, whereas the two sets of fingers 57 and 58 extend away from one another, the one pair being in overlapping relation to the finger 45 and the other pair being in overlapping relation to the finger 46 of the stamping 37 and preferably also extending beyond the finger 46 to overlapping relation with a portion of the finger 45 of the next stamping 37. The forking of the leaf-springs 56 so as to provide the fingers 57 and 58 is for the purpose of clearance with reference to the heads of the alternate rivets 40 which come between the ends of the fingers 57 and 58, as clearly appears in Fig. 1, the other fingers 59 being disposed with their ends on opposite sides of the heads of the intermediate rivets 40, as also clearly appears in Fig. 1. The rivets 42 for fastening the facing ring 41 to the stampings 38 are used also to fasten the leaf-springs 56 to the stampings 38, the fingers 53 and 54 being provided with enlarged holes 61 to receive hollow struck-out or embossed circular portions 62 on the attaching portions 60 of the leaf-springs 56, in the hollows of which the heads of the rivets 42 are received so as to lie flush with the outer faces of the leaf-springs 56, as clearly appears in Figs. 2 and 3. The purpose of this is to avoid any interference with the facing ring 39 "packing" tightly against the adjacent face of the leaf-spring 56 in the engagement of the clutch. For a similar reason the heads of the rivets 40 are made as thin or thinner than the leaf-springs 56 so that they will not interfere with the "packing" of the facing ring 41 tightly against the other face of the leaf-springs 56 (see Fig. 3). Each leaf-spring 56 has a small struck-out hollow circular boss 63 on the attaching portion 60 in radially spaced relation to the boss 62 and arranged to engage in a hole 64 provided therefore in the stamping 38, each of the fingers 53 and 54 being provided with these holes and half of the leaf-springs 56 having their bosses 62 and 63 struck in one direction and the other half having their bosses 62 and 63 struck in the opposite direction to permit assembling the same in reversed relationship to one another, those of one type alternating with those of the other type. The engagement of the bosses 63 in the hole 64 locks the leaf-springs 56 against turning about the rivets 42 as centers. In operation, it should be clear that as the pressure plate is moved toward the flywheel in the engagement of the clutch the facings 39 and 41 are pressed together, flexing the fingers 57, 58 and 59, of all of the leaf-springs 56 so that the spring pressure of the leaf-springs 56 tending to keep the facings 39 and 41 apart insures the desired smooth engagement of the clutch and avoids grabbing. The leaf-springs 56 being normally flat will of course exert increasing spring pressure on the facings 39 and 41 as they approach fully engaged relationship, the outer portion of the clutch plate being tightly packed between the pressure plate and flywheel when the clutch is fully engaged. In full engagement of the clutch, the facing ring 39 is pressed tightly against the adjacent face of the leaf-springs 56 and the facing ring 41 is pressed tightly against the other face of the leaf-springs 56. Such tight packing is possible only because of the fact that the fingers 44, 45 and 46 on the stampings 37 can be flexed into the same plane with the fingers 53 and 54 of the stampings 38. When the clutch is disengaged, the leaf-springs 56 return to the flat unflexed form and accordingly return the fingers of the stampings 37 and 38 to their normal spaced parallel relationship. The fact that all of the leaf-springs 56 are flat, as distinguished from specially formed spring metal parts previously provided for motion purposes, makes for a clutch plate of uniform increased thickness in the disengaged condition and therefore obviates the objection common in many other clutch plate constructions of non-uniform engagement and accordingly non-uniform and rapid wear of the clutch plate facings and a tendency for the clutch to grab. In other words, flat leaf-springs like those shown at 56 can be produced to the desired uniformity, whereas specially shaped parts cannot be produced to a desired uniformity without difficulty, which means close rigorous inspection and a high percentage of rejections in quantity production of clutch plates. The fact that the fingers 57 and 58 of every alternate leaf-spring 56 cooperates not only with the finger 46 of one stamping 37 but to a certain extent also with the finger 45 of the next stamping 37 further insures accurate coplanar alignment of all of the stampings 37 in one plane and coplanar alignment of all of the stampings 38 in a parallel plane. The fact that the present motion construction requires spring steel only in the leaf-springs 56 is of course an important factor from the economy standpoint. In passing, attention is called to the fact that the fingers 44, 45 and 46 on the stampings 37 are bent between dies on the lines 65 normal to their radii and next to the point of attachment of the stampings to the ring 20 and housing plates 27 slightly in the direction of the stamping 38, and the fingers 53 and 54 of the stampings 38 are bent between dies in the opposite direction toward the stamping 37 on corresponding lines 66 normal to their radii and next to the point of attachment of the stamping 38 to the ring 20 and housing plates 27, whereby when the stampings 37 and 38 are riveted at 25 with the leaf-springs 56 assembled in place therebetween, the fingers 57, 58 and 59 of the leaf-springs are solidly engaged with the stampings 37 but the stampings 37 are in accurate parallelism with the stampings 38. In other words, the bending along the lines 65 and 66 is so slight that the pressure of the fingers on the stampings 37 and 38 on the fingers of the leaf-springs 56 is not sufficient to flex the latter but is only enough to insure uniform thickness of plates throughout their circumference, in quantity production.

Referring now to Figs. 4 to 7, the clutch plate shown in Fig. 4 is the same in construction in so far as the spring cushioning means and fluid dampening means is concerned but the outer portion of the plate is of different construction. Sheet metal stampings 67 and 68 take the place of the stampings 37 and 38 of the previous construction and cooperate with leaf-springs 69 in a closely similar manner, in this construction, the stampings 67 and generally H-shaped openings 70 punched therein defining an arcuate peripheral web portion 71 connecting the outer ends of radial web portions 72 and 73 the inner end portions of which are integral with an arcuate attaching web portion 74 concentric with the web portion 71. Arcuate fingers 75 and 76 are also defined in the punching of the H-shaped opening 70 in radially shaped relation to the web portion 74 and substantially concentric therewith. Each sheet metal stamping 68 cooperating with a companion stamping 67 is made T-shaped so as to provide an inner arcuate attaching portion 77, a radial leg portion 78 projecting from the middle of the attaching portion 77 and a cross-portion providing one arcuate finger 79 disposed radially between the finger 75 and web 71 and another arcuate finger 80 disposed radially between the finger 76 and web 71. The leaf-springs 69 in this construction serve a similar purpose to the leaf-springs 56 of the other construction and are also generally h-shaped, although each has three fingers 81—83 on one side of the intermediate attaching portion 84 and a single finger 85 on the other side of said attaching portion. The rivets 25' in this construction correspond to the rivets 25 of the other construction and serve to fasten the stampings 67 and 68 in parallel relationship to one another to the peripheral portion of the housing plates 27 with the T-shaped portion of each of the stampings 68 normally in spaced parallel relation to the perforated portion 70 of the companion stamping 67. The rivets 42' for fastening the leaf-springs 69 to the stampings 68 correspond to the rivets 42 of the other construction and are entered in the circular boss portions 62' provided in the attaching portions 84 of said leaf-springs, these boss portions 62' being entered in openings 61' provided therefor in the stampings 68 so that the rivets 42' used for fastening the leaf-springs 69 to the stampings 68 and also fastening the friction facing 41' to the opposite side of the stampings 68 do not have the heads on the inner ends thereof projecting from the plane of the leaf-springs 69 and will not therefore interfere with tight packing of the friction facing 39' against the leaf-spring 69 in the engagement of the clutch. The fingers 83 have small circular bosses 86 struck therefrom arranged to engage in holes 87 provided therefor in the web portion 71 of the stampings 67 whereby to hold the leaf-springs 69 against turning about the rivets 42' as centers and thus keep the fingers 81—83 in proper relation to the web portions 71 and the fingers 85 in proper relation to the fingers 75 and 76. It should be clear that half of the leaf-springs 69 on the plate shown have their bosses 62' struck in one direction while the other half have their bosses 62' struck in the opposite direction so that these leaf-springs may be assembled in the plate in reversed relation to one another, the same being true with regard to the bosses 86 which on one half of the leaf-springs are struck in one direction and on the other half in the opposite direction. While I have shown all of the stampings 67 on one face of the plate and all of the stampings 68 on the other face, it should be understood that I may if desired alternate the arrangement of the stampings, having the stampings 67 alternately on opposite faces so that the stampings 68 occur alternately on the respectively opposite faces, the leaf-springs 69 in such a construction being still mounted on the stampings 68 and cooperating with the stampings 67 in the same manner as herein illustrated. The operation of this clutch plate is closely similar to that of the other construction. In the engagement of the clutch, as the pressure plate approaches the flywheel and the facings 39' and 41' are moved toward each other, the leaf-springs 69 have their fingers 81—83 and 85 flexed, the T-shaped portion of the stampings 68 moving into the slotted portions 70 of the stampings 67 and into substantially coplanar relationship. In full engagement the facing 39' is packed tightly against the adjacent face of the attaching portions of the leaf-springs 69, and the facing 41' is packed tightly against the adjacent face of the fingers 81—83 and 85. Here again, as in the other construction, it is preferred to bend the main body portion of each of the stampings 67 and 68 relative to the attaching portions so that the leaf-springs 69 are solidly engaged on opposite sides by the associated stampings and the resulting clutch plate has a uniform thickness throughout the circumference of the facing portion.

It is believed the foregoing description conveys a good understanding of the objects and advantages of my invention. The appended claims have been drawn with a view to covering all legitimate modifications and adaptations.

I claim:

1. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted in slightly axially spaced relation to one another on the hub to turn therewith and projecting radially therefrom, the plate sections of one series having openings provided therein and the plate sections of the other series having portions in register with said openings and formed to fit freely in said openings, whereby the two series of plate sections are adapted to have the registering portions compacted into substantially coplanar relationship.

2. In a device of the character described, a hub, two parallel series of plate sections concentrically arranged relative to the axis of said hub and mounted on the hub to turn therewith, the plate sections of one series having openings provided therein and the plate sections of the other series having portions in register with said openings and formed to fit freely in said openings, whereby the two series of plate sections are adapted to have the registering portions compacted into substantially coplanar relationship, and leaf-springs interposed between said plate sections to resist the compacting thereof.

3. In a device of the character described, a hub, two parallel series of plate sections concentrically arranged relative to the axis of said hub and mounted on the hub to turn therewith, the plate sections of one series having openings provided therein and the plate sections of the other series having portions in register with said portions and formed to fit freely in said openings, whereby the two series of plate sections are adapted to have the registering portions compacted into substantially coplanar relationship, and flat leaf-springs disposed in approximate parallelism with the plate sections of the two series and between said series and supported on the plate sections of the one series so as to be flexed between the plate sections of the two series to resist compacting thereof.

4. In a device of the character described, a hub, two parallel series of plate sections concentrically arranged relative to the axis of said hub and mounted on the hub to turn therewith, the plate sections of one series having openings provided therein and the plate sections of the other series having portions in register with said openings and formed to fit freely in said openings, whereby the two series of plate sections are adapted to have the registering portions compacted into substantially coplanar relationship, leaf-springs interposed between said plate sections to resist the compacting thereof, friction facing material on the outer faces of said sections, and means for fastening the material to the sections so as to secure the leaf-springs in assembled position between the plate sections.

5. In a device of the character described, a hub, two parallel series of plate sections concentrically arranged relative to the axis of said hub and mounted on the hub to turn therewith, the plate sections of one series having openings provided therein and the plate sections of the other series having portions in register with said portions and formed to fit freely in said openings, whereby the two series of plate sections are adapted to have the registering portions compacted into substantially coplanar relationship, flat leaf-springs disposed in approximate parallelism with the plate sections of the two series and between said series and supported on the plate sections of the one series so as to be flexed between the plate sections of the two series to resist compacting thereof, rings of friction facing material abutting the outer faces of said plate sections, means for securing one of said rings to the one series of plate sections, and means for securing the other of said rings to the other series of plate sections, one of the two last-mentioned means serving to secure the leaf-springs to the one series of plate sections.

6. In a device of the character described, a hub, two parallel series of plate sections concentrically arranged relative to the axis of said hub and mounted on the hub to turn therewith, the plate sections of one series having openings provided therein and the plate sections of the other series having portions in register with said portions and formed to fit freely in said openings, whereby the two series of plate sections are adapted to have the registering portions compacted into substantially coplanar relationship, flat leaf-springs disposed in approximate parallelism with the plate sections of the two series and between said series and supported on the plate sections of the one series so as to be flexed between the plate sections of the two series to resist compacting thereof, rings of friction facing material abutting the outer faces of said plate sections, rivets extending through one of said rings and the plates of one series to fasten the ring thereto, said rivets having the heads on the inner ends thereof lying between the leaf-springs and of a thickness no greater than the thickness of said leaf-springs so as not to interfere with close compacting of the plate sections, and rivets extending through the leaf-springs and the other plate sections and other ring facing material to fasten the leaf-springs and ring to said plate sections, said rivets having the heads on the inner ends thereof countersunk so as not to protrude from the plane of the leaf-springs, whereby to permit close compacting of the plate sections.

7. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted in slightly axially spaced relation to one another on the hub to turn therewith and projecting radially therefrom, the plate sections of one series having openings provided therein and the plate sections of the other series having portions in register with said openings and formed to fit freely in said openings, whereby the two series of plate sections are adapted to have the registering portions compacted into substantially coplanar relationship, friction facing material annularly applied to the outer faces of said plate sections, and spring means in the space between the plate sections and engaging the inner faces thereof to resist compacting of the plate sections.

8. In a device of the character described, a hub, two parallel series of plate sections concentrically arranged relative to the axis of said hub and mounted on the hub to turn therewith, the plate sections of one series having generally U-shaped openings provided therein and the plate sections of the other series having generally U-shaped portions in register with said openings and formed to fit freely in said openings, whereby the two series of plate sections are adapted to have the registering portions compacted into substantially coplanar relationship, and leaf-springs mounted on the arms of the U-shaped portions of the last-named plate sections in transverse relation thereto with the opposite ends disposed in overlapping relation to the other plate sections on opposite sides of the openings to resist compacting of the plate sections.

9. In a device of the character described, a hub, two parallel series of plate sections concentrically arranged relative to the axis of said hub and mounted on the hub to turn therewith, the plate sections of one series having generally T-shaped openings provided therein and the plate sections of the other series having generally T-shaped portions in register with said openings and formed to fit freely in said openings, whereby the two series of plate sections are adapted to have the registering portions compacted into substantially coplanar relationship, and leaf-springs mounted on the arms of the T-shaped portions of the last-named plate sections in transverse relation thereto with the opposite ends disposed in overlapping relation to the other plate sections on opposite sides of the openings to resist compacting of the plate sections.

10. In a device of the character described, a hub, two parallel series of plate sections concentrically arranged relative to the axis of said hub and mounted on the hub to turn therewith, the plate sections of one series having generally U-shaped openings provided therein and the plate sections of the other series having generally U-shaped portions in register with said openings and formed to fit freely in said openings, whereby the two series of plate sections are adapted to have the registering portions compacted into substantially coplanar relationship, and leaf-springs mounted on the arms of the U-shaped portions of the last-named plate sections in transverse relation thereto with the opposite ends disposed in overlapping relation to the other plate sections on opposite sides of the openings to resist compacting of the plate sections, one end of one of each pair of associated leaf-springs extending beyond the adjacent end of the plate section overlapped thereby and overlapping the adjacent end of the next plate section of the same series of plate sections.

11. In a friction clutch driven plate, the combination of two substantially parallel axially spaced series of plate portions in concentric relation to one another, the plate portions of one series having openings provided therein, and the plate portions of the other series having portions in register with said openings and adapted to fit freely therein, whereby the two series of plate portions are adapted to have the registering portions compacted into substantially coplanar relationship, and leaf springs interposed in the space between said plate portions to resist the compacting thereof.

12. In a friction clutch driven plate, the combination of two substantially parallel series of plate portions in concentric relation to one another, the plate portions of one series having openings provided therein and the plate portions of the other series having portions in register with said openings and adapted to fit freely therein, whereby the two series of plate portions are adapted to have the registering portions compacted into substantially coplanar relationship, and flat leaf springs disposed in approximate parallelism with the plate portions of the two series and between said series and supported on the plate portions of the one series so as to be flexed between the plate portions of the two series to resist compacting thereof.

13. In a friction clutch driven plate, the combination of two substantially parallel axially spaced series of plate portions in concentric relation to one another, the plate portions of one series having openings provided therein, and the plate portions of the other series having portions in register with said openings and adapted to fit freely therein, whereby the two series of plate portions are adapted to have the registering portions compacted into substantially coplanar relationship, leaf springs interposed in the space between said plate portions to resist the compacting thereof, friction facing material on the outer faces of said plate portions, and means for fastening the material to the portions so as to secure the leaf springs in assembled position between the plate portions.

14. In a friction clutch driven plate, the combination of two substantially parallel series of plate portions in concentric relation to one another, the plate portions of one series having openings provided therein and the plate portions of the other series having portions in register with said openings and adapted to fit freely therein, whereby the two series of plate portions are adapted to have the registering portions compacted into substantially coplanar relationship, flat leaf springs disposed in approximate parallelism with the plate portions of the two series and between said series and supported on the plate portions of the one series so as to be flexed between the plate portions of the two series to resist compacting thereof, rings of friction facing material abutting the outer faces of said plate portions, means for securing one of said rings to the one series of plate portions, and means for securing the other of said rings to the other series of plate portions, one of the two last mentioned means serving to secure the leaf springs to the one series of plate sections.

15. In a friction clutch driven plate, the combination of two substantially parallel series of plate portions in concentric relation to one another, the plate portions of one series having openings provided therein and the plate portions of the other series having portions in register with said openings and adapted to fit freely therein, whereby the two series of plate portions are adapted to have the registering portions compacted into substantially coplanar relationship, flat leaf springs disposed in approximate parallelism with the plate portions of the two series and between said series and supported on the plate portions of the one series so as to be flexed between the plate portions of the two series to resist compacting thereof, rings of friction facing material abutting the outer faces of said plate portions, rivets extending through one of said rings and the plate portion of one series to fasten the ring thereto, said rivets having the heads on the inner ends thereof lying between the leaf springs and of a thickness no greater than the thickness of said leaf springs so as not to interfere with close compacting of the plate portions, and rivets extending through the leaf springs and the other plate portions and other ring facing material to fasten the leaf springs and ring to said plate portions, said rivets having the heads on the inner ends thereof countersunk so as not to protrude from the plane of the leaf springs, whereby to permit close compacting of the plate portions.

16. In a friction clutch driven plate, the combination of two substantially parallel series of plate portions in concentric relation to one another, the plate portions of one series having generally U-shaped openings provided therein, and the plate portions of the other series having generally U-shaped portions in register with said openings and adapted to fit freely therein, whereby the two series of plate portions are adapted to have the registering portions compacted into substantially coplanar relationship, and leaf springs mounted on the arms of the U-shaped portions of the last named plate portions in transverse relation thereto with the opposite ends disposed in overlapping relation to the other plate portions on opposite sides of the openings to resist compacting of the plate portions.

17. In a friction clutch driven plate, the combination of two substantially parallel series of plate portions in concentric relation to one another, the plate portions of one series having generally T-shaped openings provided therein, and the plate portions of the other series having generally T-shaped portions in register with said openings and adapted to fit freely therein, whereby the two series of plate portions are adapted to have the registering portions compacted into substantially coplanar relationship, and leaf springs mounted on the arms of the T-shaped portions of the last named plate portions in transverse relation thereto with the opposite ends disposed in overlapping relation to the other plate portions on opposite sides of the openings to resist compacting of the plate portions.

18. In a friction clutch driven plate, the combination of two substantially parallel series of plate portions in concentric relation to one another, the plate portions of one series having generally T-shaped openings provided therein, and the plate portions of the other series having generally T-shaped portions in register with said openings and adapted to fit freely therein, whereby the two series of plate portions are adapted to have the registering portions compacted into substantially coplanar relationship, and leaf springs mounted on the arms of the T-shaped portions of the last named plate portions in transverse relation thereto with the opposite ends disposed in overlapping relation to the other plate portions on opposite sides of the openings to resist compacting of the plate portions, one end of one of each pair of associated leaf springs extending beyond the adjacent end of the plate portion overlapped thereby and overlapping the adjacent end of the next plate portion of the same series of plate portions.

19. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted on the hub to turn therewith and projecting radially therefrom, the plate sections of one series having openings provided therein and the plate sections of the other series having portions in register with said openings and formed to fit freely in said openings, whereby the two series of plate sections are adapted to have the registering portions compacted into substantially coplanar relationship, and leaf springs interposed between said plate sections to resist the compacting thereof.

20. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted on the hub to turn therewith and projecting radially therefrom, the plate sections of one series having openings provided therein and the plate sections of the other series having portions in register with said openings and formed to fit freely in said openings, whereby the two series of plate sections are adapted to have the registering portions compacted into substantially coplanar relationship, and flat leaf springs disposed in approximate parallelism with the plate sections of the two series and between said series and supported on the plate sections of the one series so as to be flexed between the plate sections of the two series to resist compacting thereof.

21. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted on the hub to turn therewith and projecting radially therefrom, the plate sections of one series having openings provided therein and the plate sections of the other series having portions in register with said openings and formed to fit freely in said openings, whereby the two series of plate sections are adapted to have the registering portions compacted into substantially coplanar relationship, leaf springs interposed between said plate sections to resist the compacting thereof, friction facing material on the outer faces of said sections, and means for fastening the material to the sections so as to secure the leaf springs in assembled position between the plate sections.

22. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted on the hub to turn therewith and projecting radially therefrom, the plate sections of one series having openings provided therein and the plate sections of the other series having portions in register with said openings and formed to fit freely in said openings, whereby the two series of plate sections are adapted to have the registering portions compacted into substantially coplanar relationship, flat leaf springs disposed in approximate parallelism with the plate sections of the two series and between said series and supported on the plate sections of the one series so as to be flexed between the plate sections of the two series to resist compacting thereof, rings of friction facing material abutting the outer faces of said plate sections, means for securing one of said rings to the one series of plate sections, and means for securing the other of said rings to the other series of plate sections, one of the two last mentioned means serving to secure the leaf springs to the one series of plate sections.

23. In a friction clutch driven plate, the combination of a hub member, two substantially parallel series of plate sections in concentric relation to one another circumferentially with respect to the hub member, thin spacers between the radially inner portions of the plate sections normally maintaining said plate sections in slightly axially spaced relation to one another, means for securing the radially inner portions of said plate sections and said spacers to the hub member, the plate sections of one series having openings provided therein and the plate sections of the other series having portions in register with said openings and adapted to fit freely therein, whereby the two series of plate sections are adapted to have the registering portions compacted into substantially coplanar relationship, and thin flat and normally straight leaf springs interposed in the space between the plate sections in approximate parallelism therewith and arranged to be flexed when the registering portions of the plate sections are compacted into substantially coplanar relationship, whereby to resist the compacting thereof.

24. In a friction clutch driven plate, the combination of a hub member, two substantially parallel series of plate sections in concentric relation to one another circumferentially with respect to the hub member, said plate sections being mounted on the hub member so that the radially outer portions thereof are in slightly axially spaced relation to one another, the plate sections of one series having openings provided therein and the plate sections of the other series having portions in register with said openings and adapted to fit freely therein, whereby the two series of plate sections are adapted to have the registering portions compacted into substantially coplanar relationship, and thin flat and normally straight leaf springs interposed in the space between the plate sections in approximate parallelism therewith and arranged to be flexed when the registering portions of the plate sections are compacted into substantially coplanar relationship, whereby to resist the compacting thereof.

W. VINCENT THELANDER.